United States Patent
Musso et al.

(10) Patent No.: US 12,371,375 B2
(45) Date of Patent: Jul. 29, 2025

(54) CEMENT SLURRIES, CURED CEMENT AND METHODS OF MAKING AND USE OF THESE

(71) Applicant: Saudi Arabian Oil Company, Dhahran (SA)

(72) Inventors: Simone Musso, Houston, TX (US); Sivaprakash Shanmugam, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/626,703

(22) Filed: Apr. 4, 2024

(65) Prior Publication Data
US 2024/0286956 A1 Aug. 29, 2024

Related U.S. Application Data

(62) Division of application No. 17/523,295, filed on Nov. 10, 2021, now Pat. No. 12,006,261.

(60) Provisional application No. 63/112,265, filed on Nov. 11, 2020.

(51) Int. Cl.
| | | |
|---|---|---|
| C09K 8/473 | (2006.01) |
| C04B 22/06 | (2006.01) |
| C04B 24/26 | (2006.01) |
| C08F 220/06 | (2006.01) |
| C08L 51/10 | (2006.01) |
| C04B 103/00 | (2006.01) |

(52) U.S. Cl.
CPC ........ *C04B 24/2641* (2013.01); *C04B 22/064* (2013.01); *C08F 220/06* (2013.01); *C08L 51/10* (2013.01); *C09K 8/473* (2013.01); *C04B 2103/0059* (2013.01); *C04B 2103/0061* (2013.01)

(58) Field of Classification Search
CPC .............. C04B 24/2641; C04B 22/064; C04B 2103/0059; C04B 2103/0061; C04B 20/0004; C04B 28/02; C04B 40/0633; C08F 220/06; C08F 8/42; C08F 2438/03; C08F 292/00; C08F 293/005; C08F 299/00; C08L 51/10; C09K 8/473; Y02W 30/91

See application file for complete search history.

(56) References Cited

U.S. PATENT DOCUMENTS

| | | | |
|---|---|---|---|
| 4,569,393 A | 2/1986 | Bruning et al. |
| 6,875,729 B2 | 4/2005 | Verlaan et al. |
| 7,081,295 B2 | 7/2006 | James et al. |
| 7,353,876 B2 | 4/2008 | Savery et al. |
| 8,053,397 B2 | 11/2011 | Huang et al. |
| 8,273,173 B2 | 9/2012 | Perera Mercado et al. |
| 8,710,152 B2 | 4/2014 | Farcet et al. |
| 8,822,386 B2 | 9/2014 | Quintero et al. |
| 9,475,922 B2 * | 10/2016 | Benicewicz ............. C08K 9/04 |
| 9,611,175 B2 | 4/2017 | Stark |
| 9,765,252 B2 | 9/2017 | Roddy et al. |
| 9,951,266 B2 | 4/2018 | Tang |
| 10,138,331 B2 * | 11/2018 | Li ........................ C08G 83/001 |
| 2006/0167147 A1 | 7/2006 | Asgari |
| 2007/0072979 A1* | 3/2007 | Moad ...................... C08L 23/10 |
| | | | 524/445 |
| 2007/0160826 A1 | 7/2007 | Wang et al. |
| 2009/0082230 A1 | 3/2009 | Javora et al. |
| 2011/0257289 A1 | 10/2011 | Biggs et al. |
| 2012/0067581 A1 | 3/2012 | Auzerais et al. |
| 2012/0191214 A1 | 7/2012 | Nies |
| 2014/0374095 A1 | 12/2014 | Ladva et al. |
| 2018/0298272 A1 | 10/2018 | Qu et al. |
| 2019/0161669 A1 | 5/2019 | Droger et al. |
| 2019/0194522 A1 | 6/2019 | Sodhi et al. |

FOREIGN PATENT DOCUMENTS

| | | |
|---|---|---|
| CN | 103497272 A | 1/2014 |
| CN | 103819111 A | 5/2014 |
| CN | 103819702 A | 5/2014 |
| CN | 108947459 A | 12/2018 |
| EP | 0212671 | 3/1987 |
| WO | 2014011603 A1 | 1/2014 |
| WO | 2017137789 A1 | 8/2017 |
| WO | 2017137791 A1 | 8/2017 |
| WO | 2017174208 A1 | 10/2017 |
| WO | 2017218720 A1 | 12/2017 |

OTHER PUBLICATIONS

Beavers et al. "Lactic acid-magnesium oxide nanocrystal interactions: how nanoparticle size and shape affect chemistry and template oligomerization" New J. Chem., 2009, 33, 1951-1959, 9 pgs.
Jong et al. "New insights into the hydrolytic degradation of poly(lactic acid): participation of the alcohol terminus" Polymer 42 (2001) 2795-2802, 8 pgs.
Inui et al. "Pressure-Sensitive Adhesion System Using Acrylate Block Copolymers in Response to Photoirradiation and Postbaking as the Dual External Stimuli for On-Demand Dismantling" ACS Appl. Mater. Interfaces 2012, 4, 2124-2132, 9 pgs.
Ma et al. "Nanocomposites of poly(L-lactide) and surface modified magnesia nanoparticles: Fabrication, mechanical property and biodegradability" Journal of Physics and Chemistry of Solids 72 (2011) 111-116, 6 pgs.
Rasal et al. "Poly(lactic acid) modifications" Progress in Polymer Science 35 (2010) 338-356, 19 pgs.

(Continued)

*Primary Examiner* — Kumar R Bhushan
(74) *Attorney, Agent, or Firm* — Dinsmore & Shohl LLP

(57) ABSTRACT

Cement slurries, cured cements, and methods of making cured cement and methods of using cement slurries are provided. The cement slurries have, among other attributes, improved expanding capabilities and may be used, for instance, in the oil and gas drilling industry. The cement slurry comprises water, a cement precursor material, and an expanding agent. The expanding agent comprising at least a poly(acrylic acid)-metal oxide nanocomposite, where the metal oxide comprises MgO, CaO, or both, and the poly(acrylic acid) comprises a t-butyl terminal group, an isobornyl terminal group, or both.

10 Claims, No Drawings

(56) References Cited

OTHER PUBLICATIONS

Sayadi et al. "Ultra-lightweight Concrete Containing Expanded Poly-lactic Acid as Lightweight Aggregate" KSCE Journal of Civil Engineering (2018) 22(10):4083-4094, 12 pgs.
Sayadi et al. "Influence of poly-lactic acid on the properties of perlite concrete" Construction and Building Materials 189 : 660(16), 2018, 20 pgs.
Wang et al. "Imporving efficiency of calcium oxide expansive additives by polylactic acid film" Magazine of Concrete Research, 2016, 68(20), 1070-1078, 9 pgs.
Wen et al. "Strengthening and toughening of poly(L-lactide) composites by surface modified MgO whiskers" Applied Surface Science 332 (2015) 215-223, 9 pgs.
Xu et al. "Effects of Temperature and pH on the Degradation of Poly(lactic acid) Brushes" Macromolecules 2011, 44, 4777-4782, 6 pgs.
Notification of Transmittal of the International Search Report and the Written Opinion of the International Searching Authority, or the Declaration dated May 3, 2022 pertaining to International application No. PCT/US2021/058770 filed Nov. 10, 2021, pp. 1-19.
First Examination Report issued in corresponding Saudi Arabian Application 523440715, pp. 1-7, dated Apr. 17, 2025.

\* cited by examiner

CEMENT SLURRIES, CURED CEMENT AND METHODS OF MAKING AND USE OF THESE

CROSS-REFERENCE TO RELATED APPLICATIONS

This application claims the benefit of U.S. Non-Provisional application Ser. No. 17/523,295 filed Nov. 10, 2021, the entire disclosure of which is hereby incorporated herein by reference.

TECHNICAL FIELD

Embodiments of the present disclosure generally relate to cement slurries and methods of making and using cement slurries and to cured cements and methods of making cured cement.

BACKGROUND

Cement slurries are used in the oil and gas industries, such as for cementing in oil and gas wells. Primary, remedial, squeeze, and plug cementing techniques can be used, for instance, to place cement sheaths in an annulus between casing and well formations, for well repairs, well stability, or for well abandonment (sealing an old well to eliminate safety hazards). These cement slurries must be able to consistently perform over a wide range of temperatures and conditions as cement set in an oil and gas well may be vulnerable to cyclic stresses imposed by pressure and temperature fluctuations. A brittle cement may crack and break under these stresses, reducing the integrity of the wellbore.

SUMMARY

Adding expanding agents to cement slurry can be vital to the strength and expanding and performance properties of the cured cement composition. However, conventional expanding agents expand immediately upon contact with the water in the cement slurry, limiting the ability of the cement slurry or cured cement to expand further once placed downhole.

Accordingly, there is an ongoing need for cement slurries that are resistant to cyclic stresses and capable of expanding to seal against water seepage after downhole placement. Furthermore, cured cements having expanding characteristics prevent cracking and breaking under cyclic stresses. The present embodiments address these needs by providing cement slurries and methods of making and using cement slurries that include an expanding agent that expands upon contact with water in temperatures greater than 100° C., avoiding premature expansion at the mixing stage, at the surface of the well, or before curing. The expanding agent described herein include at least a poly(lactic acid)-metal oxide nanocomposite, a poly(acrylic acid)-metal oxide nanocomposite, or both, where the poly(lactic acid) or poly(acrylic acid) protects the metal oxide from premature contact with water before downhole placement. In particular, the poly(lactic acid) or poly(acrylic acid) degrades when in contact with water in temperatures greater than 100° C., thereby allowing the water to contact the metal oxide and form expanding crystals to seal against water seepage. Specifically, the poly(lactic acid) or poly(acrylic acid) may degrade by undergoing depolymerization when in contact with water in temperatures greater than 100° C., which means that the long polymer chains undergo scission to form short chains that further break down to form monomers. In the case of polyacrylic acid, degradation at high temperature leads to the formation of anhydrides and aromatic chars. The degradation products of poly(acrylic acid) do not lead to the formation of acrylic acid monomers and do not provide a pathway for regeneration of poly(acrylic acid).

In one embodiment, a cement slurry is provided that comprises water, a cement precursor material, and an expanding agent. The expanding agent comprising at least a poly(lactic acid)-metal oxide nanocomposite. The metal oxide comprises MgO, CaO, or both, and the poly(lactic acid) comprises a carboxylic acid terminal group.

In another embodiment, a method of cementing a casing in a wellbore is provided. The method comprises pumping a cement slurry into an annulus between the casing and the wellbore. The cement slurry comprises water, a cement precursor material, and an expanding agent. The expanding agent comprises at least a poly(lactic acid)-metal oxide nanocomposite. The metal oxide comprises MgO, CaO, or both, and the poly(lactic acid) comprises a carboxylic acid terminal group. The method further comprises curing the cement slurry to cement the casing in the wellbore.

In a further embodiment, a method of producing a poly(lactic acid)-metal oxide nanocomposite is provided. The method comprises reacting poly(lactic acid) with MgO nanocomposites, CaO nanocomposites, or both. The method further comprises reacting the poly(lactic acid) with an anhydride to add a carboxylic acid terminal group to the poly(lactic acid), thereby forming the poly(lactic acid)-metal oxide nanocomposite.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "cement slurry" refers to a composition comprising a cement precursor that is mixed with at least water to form cement. The cement slurry may contain calcined alumina ($Al_2O_3$), silica ($SiO_2$), calcium oxide (CaO, also known as lime), iron oxide (FeO), magnesium oxide (MgO), clay, sand, gravel, and mixtures of these.

As used throughout this disclosure, "curing" refers to providing adequate moisture, temperature and time to allow the concrete to achieve the desired properties (such as hardness) for its intended use through one or more reactions between the water and the cement precursor material.

As used throughout this disclosure, "drying" refers to merely allowing the cement to achieve a moisture condition appropriate for its intended use, which may only involve physical state changes as opposed to chemical reactions.

As used throughout this disclosure, the term "retarder" refers to a chemical agent used to increase the thickening time of cement slurries to enable proper placement of the cement slurry within the wellbore. The need for cement retardation increases with depth due to the greater time required to complete the cementing operation and the effect of increased temperature on the cement-setting process.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "thickening time" refers to a measurement of the time during which a cement slurry remains in a fluid state and is capable of being pumped. Thickening time is assessed under downhole conditions using a pressurized consistometer that plots the viscosity of a slurry over time under the anticipated temperature and pressure conditions. The end of the thickening time is conventionally about 50 or 70 Bearden units of consistency (Bc), a dimensionless quantity with no direction conversion factor to more common units of viscosity. The Bearden units of consistency is measured on a scale from 1 to 100 where difficult pumping begins at 50 Bc and cement is completely set at 100 Bc.

As used throughout this disclosure, the term "wellbore" refers to the drilled hole or borehole, including the openhole or uncased portion of the well. Borehole may refer to the void space defined by the wellbore wall, where the rock face that bounds the drilled hole defines the borehole.

Embodiments of the present disclosure relate to cement slurries and cured cements with elasticity and self-healing capabilities. Embodiments of the present disclosure also relate to methods of producing and using cement slurries, in some particular embodiments, for use in the oil and gas industries.

Oil and gas wells may be formed in subsurface formations. The wellbore may serve to connect natural resources, such as petrochemical products, to a ground level surface. In some embodiments, a wellbore may be formed in the subsurface formation, which may be formed by a drilling procedure.

In some instances, a casing may be inserted into the wellbore. The casing may be a pipe which has a diameter less than that of the wellbore. Generally, the casing may be lowered into the wellbore such that the bottom of the casing reaches to a region near the bottom of the wellbore. In some embodiments, the casing may be cemented by inserting a cement slurry into the annulus region between the outer edge of the casing and the edge of the wellbore (the surface of the subsurface formation). The cement slurry may be inserted into the annular region by pumping the cement slurry into the interior portion of the casing, to the bottom of the casing, around the bottom of the casing, into the annular region, or a combination of some or all of these. The cement slurry may displace the drilling fluid, pushing it to the top of the well. In some embodiments, a spacer fluid may be used as a buffer between the cement slurry and the drilling fluid. The spacer fluid displaces and removes the drilling fluid before the cement slurry is pumped into the well to prevent contact between the drilling fluid and the cement slurry. Following the insertion of an appropriate amount of cement slurry into the interior region of the casing, in some embodiments, a displacement fluid may be utilized to push the cement slurry out of the interior region of the casing and into the annular region. This displacement may cause the entirety of the spacer fluid and drilling fluid to be removed from the annular region, out the top of the wellbore. The cement slurry may then be cured or otherwise allowed to harden.

To ensure the stability and safety of a well, it is important that the cured cement maintains integrity and isolates the wellbore from the surrounding subsurface formations. If the cement cracks or degrades under cyclic stresses, wellbore integrity and isolation may be lost, resulting in undesirable fluid communication between the wellbore and surrounding subsurface formations. Not intending to be limited by theory, this fluid communication may result in drilling fluid loss from the wellbore into the surrounding subsurface formation or in decreased wellbore pressure, possibly leading to a well control event. Therefore, wellbore integrity and isolation are critical to effective production and use of a wellbore.

The present disclosure provides cement slurries and cured cements that may have, among other attributes, expanding capabilities to address these concerns. The cement slurry of the present disclosure includes water, a cement precursor material, and an expanding agent.

The cement precursor material may be any suitable material which, when mixed with water, can be cured into a cement. The cement precursor material may be a hydraulic or a non-hydraulic cement precursor. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. A hydraulic or non-hydraulic cement precursor material may be chosen based on the desired application of the cement slurry of the present disclosure. In some embodiments, the cement precursor material may be Portland cement precursor, for example, Class G Portland Cement. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulfate as an interground addition.

The cement precursor material may include calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, trivalent chromium, calcium aluminate, silica sand, silica flour, hematite, manganese tetroxide, or combinations of these. The cement precursor material may include Portland cement, siliceous fly ash, calcareous fly ash, slag cement, silica fume, quartz, or combinations of any of these. Silica flour is a finely ground crystalline silica with a molecular formula of $SiO_2$ and with a grain size ranging from 1 to 500 microns (μm), from 10 to 500 microns, from 10 to 100 microns, from 10 to 80 microns, from 10 to 50 microns, from 10 to 20 microns, from 20 to 100 microns, from 20 to 80 microns, from 20 to 50 microns, from 50 to 100 microns, from 50 to 80 microns, or from 80 to 100 microns.

Water may be added to the cement precursor material to produce the slurry. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the cement slurry, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, vanadium, zirconium, or combinations of these.

In some embodiments, the cement slurry may contain from 10 weight percent (wt. %) to 70 wt. % by weight of cement precursor (BWOC) water. In some embodiments, the cement slurry may contain from 10 wt. % to 40 wt. %, from 10 wt. % to 30 wt. %, from 10 wt. % to 20 wt. %, from 20 wt. % to 40 wt. %, from 25 wt. % to 35 wt. %, or from 20 wt. % to 30 wt. % BWOC water. The cement slurry may contain 30 wt. % BWOC water.

As previously stated, along with the cement precursor material and water, the cement slurry further includes an expanding agent. In embodiments, the expanding agent may include at least a poly(lactic acid)-metal oxide nanocomposite. Alternatively or additionally, the expanding agent may include at least a poly(acrylic acid)-metal oxide nanocomposite. In embodiments, the metal oxide of the poly(lactic acid)-metal oxide nanocomposite or the poly(acrylic acid)-metal oxide nanocomposite comprises MgO, CaO, or both.

The poly(lactic acid) may include a carboxylic acid terminal group. In embodiments, the poly(lactic acid) having the carboxylic acid terminal group may be a reaction product of poly(lactic) acid and succinic anhydride, maleic anhydride, or both.

The poly(acrylic acid) may include a t-butyl terminal group, an isobornyl terminal group, or both.

In embodiments where the expanding agent includes at least a poly(lactic acid)-metal oxide nanocomposite, the poly(lactic acid)-metal oxide nanocomposite may have a structure of:

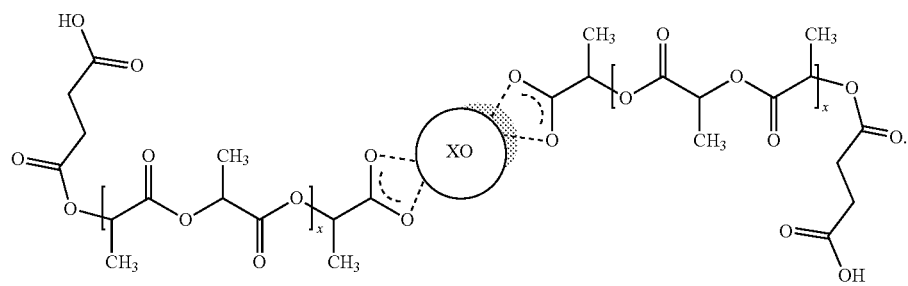

where XO is the metal oxide, such as alkaline earth metal oxides, and x is from 1 to 100, from 1 to 75, from 1 to 50, from 1 to 25, from 25 to 100, from 25 to 75, from 25 to 50, from 50 to 100, from 50 to 75, or from 75 to 100. Alkaline earth metal oxides may include BeO, MgO, CaO, SrO, BaO, RaO, or combinations thereof.

In embodiments where the expanding agent includes at least a poly(acrylic acid)-metal oxide nanocomposite where the poly(acrylic acid) has a t-butyl terminal group, the poly(acrylic acid)-metal oxide nanocomposite may have a structure of:

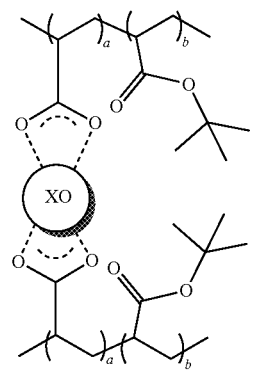

where XO is the metal oxide; a ranges from 1 to 100, from 1 to 75, from 1 to 50, from 1 to 25, from 25 to 100, from 25 to 75, from 25 to 50, from 50 to 100, from 50 to 75, or from 75 to 100; and b ranges from 1 to 100, from 1 to 75, from 1 to 50, from 1 to 25, from 25 to 100, from 25 to 75, from 25 to 50, from 50 to 100, from 50 to 75, or from 75 to 100.

In embodiments where the expanding agent includes at least a poly(acrylic acid)-metal oxide nanocomposite where the poly(acrylic acid) has an isobornyl terminal group, the poly(acrylic acid)-metal oxide nanocomposite may have a structure of:

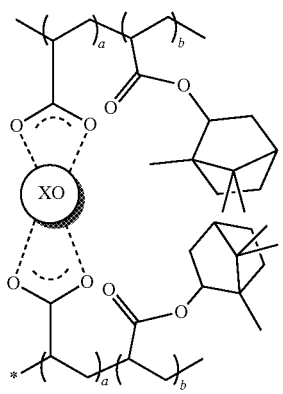

where XO is the metal oxide; a ranges from 1 to 100, from 1 to 75, from 1 to 50, from 1 to 25, from 25 to 100, from 25 to 75, from 25 to 50, from 50 to 100, from 50 to 75, or from 75 to 100; and b ranges from 1 to 100, from 1 to 75, from 1 to 50, from 1 to 25, from 25 to 100, from 25 to 75, from 25 to 50, from 50 to 100, from 50 to 75, or from 75 to 100.

The cement slurry may include from 5 to 25 wt. %, from 5 to 20 wt. %, from 5 to 17 wt. %, from 5 to 15 wt. %, from 5 to 12 wt. %, from 5 to 10 wt. %, from 5 to 7 wt. %, from 7 to 25 wt. %, from 7 to 20 wt. %, from 7 to 17 wt. %, from 7 to 15 wt. %, from 7 to 12 wt. %, from 7 to 10 wt. %, from 10 to 25 wt. %, from 10 to 20 wt. %, from 10 to 17 wt. %, from 10 to 15 wt. %, from 10 to 12 wt. %, from 12 to 25 wt. %, from 12 to 20 wt. %, from 12 to 17 wt. %, from 12 to 15 wt. %, from 15 to 25 wt. %, from 15 to 20 wt. %, from 15 to 17 wt. %, from 17 to 25 wt. %, from 17 to 20 wt. %, or from 20 to 25 wt. % by weight of cement precursor material (BWOC) expanding agent.

In embodiments in which the expanding agent comprises at least a poly(acrylic acid)-metal oxide nanocomposite, the cement slurry may further comprise from 15 to 100 mol. %, from 15 to 90 mol. %, from 15 to 80 mol. %, from 15 to 75 mol. %, from 15 to 70 mol. %, from 15 to 60 mol. %, from 15 to 50 mol. %, from 15 to 40 mol. %, from 15 to 30 mol. %, from 15 to 25 mol. %, from 15 to 20 mol. %, from 20 to 100 mol. %, from 20 to 90 mol. %, from 20 to 80 mol. %, from 20 to 75 mol. %, from 20 to 70 mol. %, from 20 to 60 mol. %, from 20 to 50 mol. %, from 20 to 40 mol. %, from 20 to 30 mol. %, from 20 to 25 mol. %, from 25 to 100 mol. %, from 25 to 90 mol. %, from 25 to 80 mol. %, from 25 to 75 mol. %, from 25 to 70 mol. %, from 25 to 60 mol. %, from 25 to 50 mol. %, from 25 to 40 mol. %, from 25 to 30 mol. %, from 30 to 100 mol. %, from 30 to 90 mol. %, from 30 to 80 mol. %, from 30 to 75 mol. %, from 30 to 70 mol. %, from 30 to 60 mol. %, from 30 to 50 mol. %, from 30 to 40 mol. %, from 40 to 100 mol. %, from 40 to 90 mol. %, from 40 to 80 mol. %, from 40 to 75 mol. %, from 40 to 70 mol. %, from 40 to 60 mol. %, from 40 to 50 mol. %, from 50 to 100 mol. %, from 50 to 90 mol. %, from 50 to 80 mol. %, from 50 to 75 mol. %, from 50 to 70 mol. %, from 50 to 60 mol. %, from 60 to 100 mol. %, from 60 to 90 mol. %, from 60 to 80 mol. %, from 60 to 75 mol. %, from 60 to 70 mol. %, from 70 to 100 mol. %, from 70 to 90 mol. %, from 70 to 80 mol. %, from 70 to 75 mol. %, from 75 to 90 mol. %, from 75 to 80 mol. %, or from 80 to 90 mol. % acid catalyst relative to the number of moles of tert-butyl and isobornyl groups in the block copolymer. The acid catalyst may include sulfonic acid, hydrochloric acid, trifluoroacetic acid, aqueous phosphoric acid, molecular iodine, an acidic metal catalyst such as zinc bromide, or combinations thereof. In embodiments, the sulfonic acid may include para-toluenesulfonic acid.

The cement slurry may have a density of from 10 to 20 pounds per gallon (ppg), from 10 to 18 ppg, from 10 to 16 ppg, from 10 to 15 ppg, from 10 to 14 ppg, from 10 to 12 ppg, from 12 to 20 ppg, from 12 to 18 ppg, from 12 to 16 ppg, from 12 to 15 ppg, from 12 to 14 ppg, from 14 to 20 ppg, from 14 to 18 ppg, from 14 to 16 ppg, from 14 to 15 ppg, from 15 to 20 ppg, from 15 to 18 ppg, from 15 to 16 ppg, from 16 to 20 ppg, from 16 to 18 ppg, or from 18 to 20 ppg.

In some embodiments, the cement slurry may contain at least one additive other than the expanding agent. The one or more additives may be any additives known to be suitable for cement slurries. As non-limiting examples, suitable additives may include accelerators, retarders, extenders, suspending agents, weighting agents, fluid loss control agents, lost circulation control agents, surfactants, antifoaming agents, and combinations of these. The suspending agents may include at least one of a copolymer of N,N-dimethylacrylamide and sodium 2-acrylamido-2-methyl propane sulfonate, and hydroxyethyl cellulose.

In some embodiments, the cement slurry may contain from 0.1 to 10% BWOC of the one or more additives based on the total weight of the cement slurry. For instance, the cement slurry may contain from 0.1 to 8% BWOC of the one or more additives, from 0.1 to 5% BWOC of the one or more additives, or from 0.1 to 3% BWOC of the one or more additives. The cement slurry may contain from 1 to 10% BWOC of the one or more additives, from 1 to 8% BWOC, from 1 to 5% BWOC, or from 1 to 3% BWOC of the one or more additives. In some embodiments, the cement slurry may contain from 3 to 5% BWOC, from 3 to 8% BWOC, from 3 to 10% BWOC, or from 5 to 10% BWOC of the one or more additives.

In some embodiments, the one or more additives may include a dispersant containing one or more anionic groups. For instance, the dispersant may include synthetic sulfonated polymers, lignosulfonates with carboxylate groups, organic acids, hydroxylated sugars, or combinations of any of these. Without being bound by any particular theory, in some embodiments, the anionic groups on the dispersant may be adsorbed on the surface of the cement particles to impart a negative charge to the cement slurry. The electrostatic repulsion of the negatively charged cement particles may allow the cement slurry to be dispersed and more fluid-like, improving flowability. This may allow for one or more of turbulence at lesser pump rates, reduction of friction pressure when pumping, reduction of water content, and improvement of the performance of fluid loss additives.

In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may include bentonite, which may additionally viscosify the cement slurry and may, in some embodiments, cause additional retardation effects.

In some embodiments, the cement slurry may contain from 0.1% BWOC to 10% BWOC of one or more fluid loss additives, the one or more dispersants, or both. The cement slurry may contain from 0.02 to 90 pounds per barrel (lb/bbl) of the fluid loss additives, the one or more dispersants, or both based on the total weight of the cement slurry. For instance, the cement slurry may contain from 0.1 to 90 lb/bbl, from 0.1 to 75 lb/bbl, from 0.1 to 50 lb/bbl, from 1 to 90 lb/bbl, from 1 to 50 lb/bbl, from 5 to 90 lb/bbl, or from 5 to 50 lb/bbl of the fluid loss additives, the one or more dispersants, or both.

Embodiments of the disclosure also relate to methods of producing the poly(lactic acid)-metal oxide nanocomposites previously described. The method for producing the poly(lactic acid)-metal oxide nanocomposites may include reacting poly(lactic acid) with MgO nanocomposites, CaO nanocomposites, or both. The method may further include reacting the poly(lactic acid) with an anhydride to add a carboxylic acid terminal group to the poly(lactic acid), thereby forming the poly(lactic acid)-metal oxide nanocomposites. The anhydride may be any of the anhydrides as previously described. Similarly, the poly(lactic acid)-metal oxide nanocomposite may have any of the structures as previously described. The reaction mechanism including reacting poly(lactic acid) with an MgO nanoparticle, and further reacting MgO nanocomposite with the succinic anhydride to form the poly(lactic acid) with a carboxylic acid terminal group is shown below as a non-limiting example and solely for illustrative purposes.

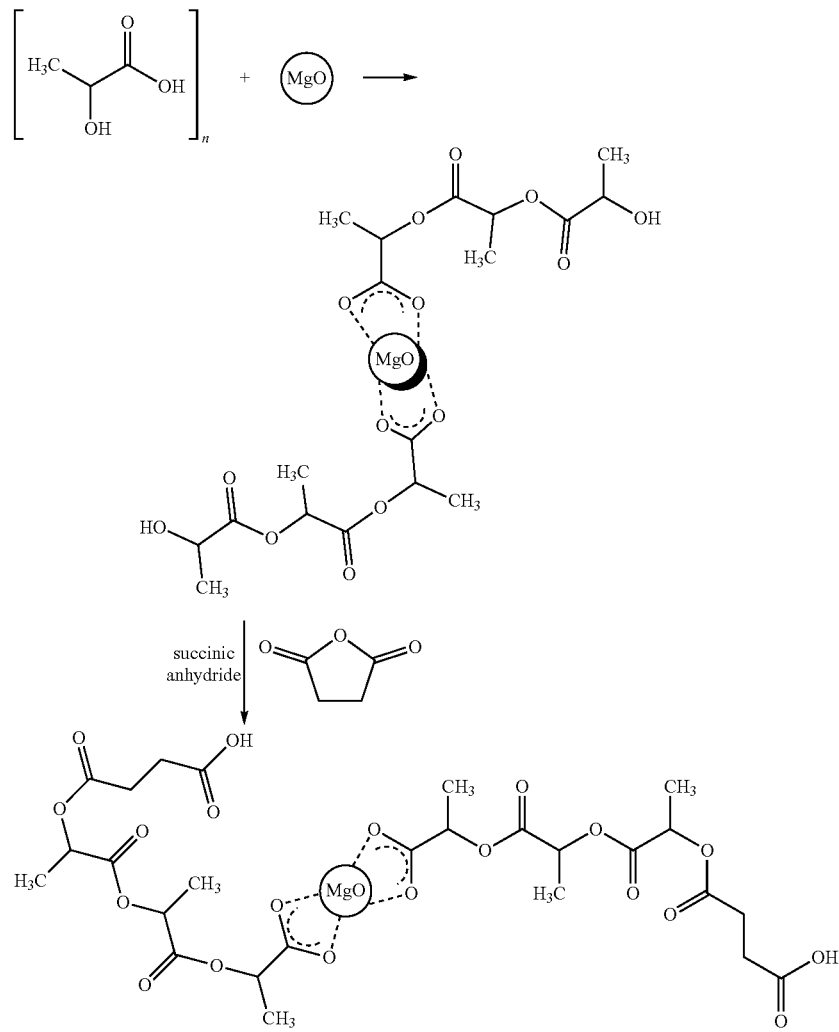

It is to be understood that any of the components may be substituted with any other component previously described.

Embodiments of the disclosure also relate to methods of producing the poly(acrylic acid)-metal oxide nanocomposites previously described. The method for producing the poly(acrylic acid) metal oxide nanocomposites may include synthesizing poly(acrylic acid) comprising a t-butyl terminal group, an isobornyl terminal group, or both via reversible addition-fragmentation chain transfer (RAFT) polymerization.

RAFT polymerization require the use of (I) initiators, (II) RAFT agents, and (III) monomers. In embodiments, the monomers may include tert-butyl acrylate, isobornyl acrylate, or both.

The initiators begin the polymerization reactions. The initiator may include 4,4'-azobis(4-cyanovaleric acid), any of the following components, or combinations thereof. In embodiments, the initiator may include hydrogen peroxides, azo compounds, redox systems, alkali metals, ammonium persulfates, ammonium perborates, ammonium perchlorates, alkali metal persulfates, or combinations thereof. The redox systems may include hydrogen peroxide, alkyl peroxide, alkyl peresters, alkyl percarbonates, iron salt, titanous salt, zinc formaldehyde sulfoxylate or sodium formaldehyde sulfoxylate, or combinations thereof. In embodiments, the alkali metals, ammonium persulfates, ammonium perborates, or ammonium perchlorates may be used in combination with an alkali metal bisulfite, reducing sugars, or both. The alkali metal bisulfite may include sodium metabisulfite. In embodiments, the alkali metal persulfates may be used in combinations with an arylphosphinic acid, reducing sugars, or both. The arylphosphinic acid may include benzenephosphonic acid.

The hydrogen peroxides may include tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, or combinations thereof.

An azo compound is a compound bearing the functional group diazenyl R—N=N—R', in which R and R' can be either aryl or alkyl. The azo compounds may include 4,4'-Azobis(4-cyanovaleic acid), 2,2'-Azobis(2-methylpropionitrile), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]-propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxy-methyl)-2-hydroxyethyl]propionamide), 2,2'-azobis(2-methyl-N-[1,1-bis(hydroxy-methyl)ethyl]propionamide), 2,2'-azobis[2-methyl-N-(2-hydroxyethyl)propionamide], 2,2'-azobis(isobutyramide) dehydrate, or combinations thereof. In embodiments, the initiator may include 4,4'-azobis(4-cyanovaleic acid), 2,2'-azobis(2-methylpropionitrile), or both. The chemical structure of 4,4'-azobis(4-cyanovaleic acid) and 2,2'-azobis(2-methylpropionitrile) are shown below:

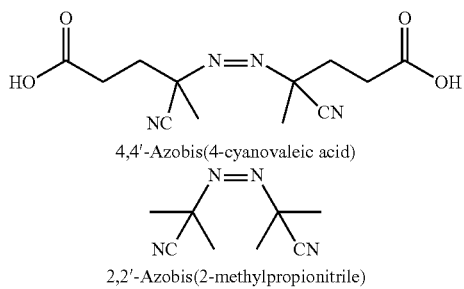

4,4'-Azobis(4-cyanovaleic acid)

2,2'-Azobis(2-methylpropionitrile)

The initiators may have an initiation temperature of from 50° C. to 80° C., from 50° C. to 75° C., from 50° C. to 70° C., from 50° C. to 65° C., from 50° C. to 60° C., from 50° C. to 55° C., from 55° C. to 80° C., from 55° C. to 75° C., from 55° C. to 70° C., from 55° C. to 65° C., from 55° C. to 60° C., from 60° C. to 80° C., from 60° C. to 75° C., from 60° C. to 70° C., from 60° C. to 65° C., from 65° C. to 80° C., from 65° C. to 75° C., from 65° C. to 70° C., from 70° C. to 80° C., from 70° C. to 75° C., or from 75° C. to 80° C. Without intending to be bound by theory, it may be desirable to have the initiation temperature be less than 100° C., less than 90° C., less than 85° C., less than 80° C., less than 75° C., less than 70° C., or less than 65° C. in order to be lower than a boiling temperature of the solvent.

The general structure of a RAFT agent is:

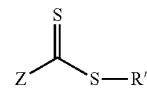

where Z referents a hydrogen atom, a chlorine atom, a sulfur atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acycloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' represents an optionally substituted alkyl, acyl, aryl, aralkyl, alkenyl or alkynyl group; a saturated or unsaturated, aromatic, optionally substituted carbocycle or heterocycle; or a polymer chain, where the polymer chain may be hydrophilic.

The R' or Z groups, when they are substituted, can be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, Se-alkyl, Se-aryl groups exhibiting a hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The RAFT agents may include sulfur, nitrogen, oxygen, selenium, phosphorus, or combinations thereof. In embodiments, the RAFT agent may include sulfur and one or more of the group consisting of nitrogen, oxygen, selenium, and phosphorus. In embodiments, the RAFT agent may include 2-(Butylthiocarbonothioylthio)propanoic acid. Without intending to be bound by theory, the RAFT agents include sulfur to ensure chemical stability at temperatures greater than or equal to 100° C. and less than or equal to 140° C., greater than or equal to 100° C. and less than or equal to 130° C., greater than or equal to 100° C. and less than or equal to 120° C., greater than or equal to 110° C. and less than or equal to 140° C., greater than or equal to 110° C. and less than or equal to 130° C., greater than or equal to 110° C. and less than or equal to 120° C., greater than or equal to 120° C. and less than or equal to 140° C., or greater than or equal to 120° C. and less than or equal to 130° C.

In embodiments, the structure of the RAFT agent may:

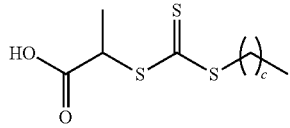

where c is from 1 to 20, from 1 to 15, from 1 to 10, from 1 to 5, from 1 to 4, from 1 to 3, from 1 to 2, from 2 to 20, from 2 to 15, from 2 to 10, from 2 to 5, from 2 to 4, from 2 to 3, from 3 to 20, from 3 to 15, from 3 to 10, from 3 to 5, from 3 to 4, from 4 to 20, from 4 to 15, from 4 to 10, from 4 to 5, from 5 to 20, from 5 to 15, from 5 to 10, from 10 to 20, from 10 to 15, or from 15 to 20.

RAFT polymerization may occur as illustrated below:

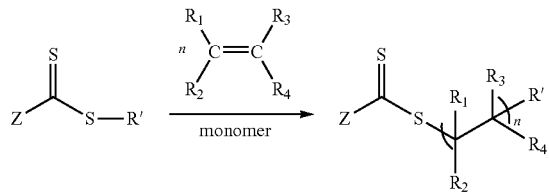

In embodiments, the RAFT polymerization may include 2 steps. The first step may be the initiation of the polymerization reaction, as shown below:

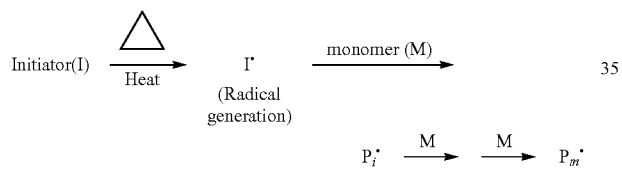

The second step may be the chain transfer reaction between radicals and the RAFT agent as shown below:

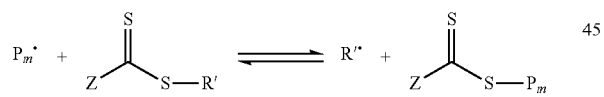

The method for producing the poly(acrylic acid) metal oxide nanocomposites may further include grafting the poly(acrylic acid) onto a XO metal oxide nanocomposites, CaO nanocomposites, or both, thereby forming the poly (acrylic acid)-metal oxide nanocomposite. The reaction mechanism including reacting poly(acrylic acid) having an t-butyl terminal group with a XO metal oxide nanoparticle is shown below as a non-limiting example and solely for illustrative purposes.

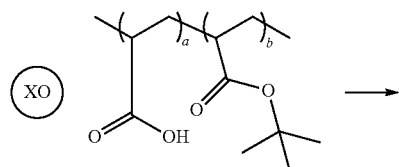

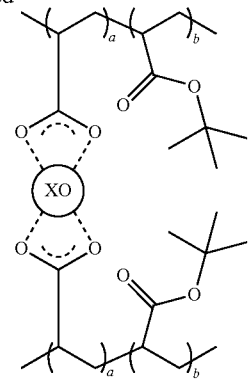

It is to be understood that any of the components may be substituted with any other component previously described.

The reaction mechanism including reacting poly(acrylic acid) having an isobornyl terminal group with a XO metal oxide nanoparticle is shown below as a non-limiting example and solely for illustrative purposes.

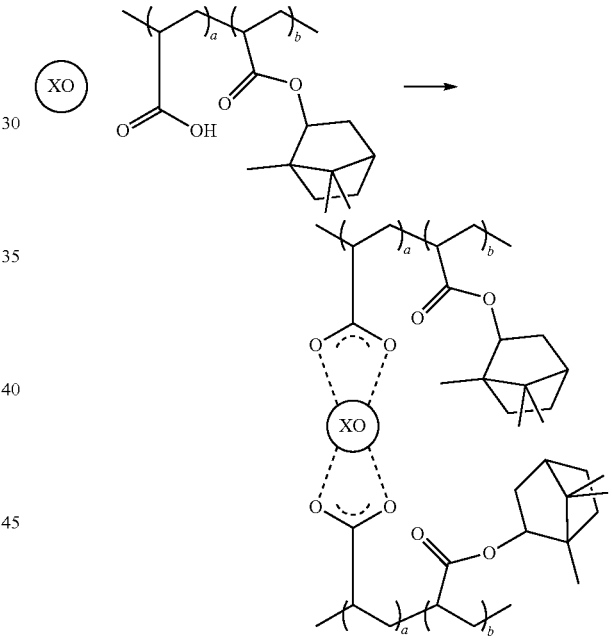

It is to be understood that any of the components may be substituted with any other component previously described.

Embodiments of the disclosure also relate to methods of producing the cement slurries previously described. In some embodiments, the method for producing a cement slurry may include mixing water with a cement precursor material and the expanding agent to produce a cement slurry. The water, cement precursor material, and expanding agent may be in accordance with any of the embodiments previously described. The cement slurry may include one or more additives, including but not limited to defoamers, dispersants, and fluid loss additives. The mixing step, in some embodiments, may involve shearing the water, cement precursor material, expanding agent, and, optionally, other additives at a suitable speed for a suitable period of time to form the cement slurry. In one embodiment, the mixing may be done in the lab using a standard API blender for 15 seconds at 4,000 rotations per minute (RPM) and 35 seconds at 12,000 RPM. The equation of mixing energy is:

$$\frac{E}{M} = \frac{k\omega^2 t}{V} \qquad \text{EQUATION 1}$$

where
E=Mixing energy (kiloJoules)
M=Mass of slurry (kilograms)
k=6.1×10$^{-8}$ meters to the fifth power per second (constant found experimentally)
ω=Rotational speed (radians/s)
t=Mixing time (seconds)
V=Slurry volume (cubic meters)

Further embodiments of the present disclosure relate to methods of using the cement slurries previously described. In some embodiments, the method may include pumping the cement slurry into a location to be cemented and curing the cement slurry by allowing the water and the cement precursor material to react. The location to be cemented may, for instance, be a well, a wellbore, or an annulus.

Cementing is performed when the cement slurry is deployed into the well via pumps, displacing the drilling fluids still located within the well and replacing them with cement. The cement slurry flows to the bottom of the wellbore through the casing, which will eventually be the conduit through which the hydrocarbons flow to the surface. From there, the cement slurry fills in the space between the casing and the wellbore wall, and hardens. This creates a seal so that outside materials cannot enter the well flow as well as permanently positions the casing in place. In preparing a well for cementing it is important to establish the amount of cement required for the job. This may be done by measuring the diameter of the borehole along its depth using a caliper log. Utilizing both mechanical and sonic means, multi-finger caliper logs measure the diameter of the well at numerous locations simultaneously in order to accommodate for irregularities in the wellbore diameter and determine the volume of the open hole.

In some embodiments, curing the cement slurry may refer to passively allowing time to pass under suitable conditions upon which the cement slurry may harden or cure through allowing one or more reactions between the water and the cement precursor material. Suitable conditions may be any time, temperature, pressure, or humidity known in the cement industry to cure a cement composition. In some embodiments, suitable curing conditions may be ambient conditions. Curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, or a combination of these. Usually, the cement will be cured and convert from slurry to solid due to subsurface formation conditions, temperature, and pressure.

In some embodiments, curing may occur at a relative humidity of greater than or equal to 80% in the cement slurry and a temperature of greater than or equal to 50° F. for a time period of from 1 to 14 days. Curing may occur at a relative humidity of from 80% to 100%, such as from 85% to 100%, or 90% to 100%, or from 95% to 100% relative humidity in the cement slurry. The cement slurry may be cured at temperatures of greater than or equal to 50° F., such as greater than or equal to 75° F., greater than or equal to 80° F., greater than or equal to 100° F., greater than or equal to 120° F., or greater than or equal to 180° F. The cement slurry may be cured at temperatures of from 50° F. to 250° F., or from 50° F. to 200° F., or from 50° F. to 150° F., or from 50° F. to 120° F., or from 50° F. to 180° F. In some instances, the temperature may be as great as 200° F., 300° F., 400° F., or 500° F. The cement slurry may be cured at pressures of greater than or equal to 20 pounds per square inch (psi), greater than or equal to 200 psi, greater than or equal to 500 psi, greater than or equal to 1000 psi, greater than or equal to 2000 psi, or greater than or equal to 3000 psi. The cement slurry may be cured at pressures of from 20 psi to 5000 psi, or from 200 psi to 5000 psi, or from 200 psi to 3000 psi, or from 500 psi to 2000 psi, or from 500 psi to 3000 psi. In some instances, the pressure may be as great as 1000 psi, 2000 psi, 3000 psi, 5000 psi, or 10000 psi. The cement slurry may be cured for from 1 day to 14 days, such as from 3 to 14 days, or from 5 to 14 days, or from 7 to 14 days, or from 1 to 4 days, or from 4 to 7 days.

Further embodiments of the present disclosure relate to particular methods of cementing a casing in a wellbore. The method may include pumping a cement slurry into an annulus between a casing and a wellbore and curing the cement slurry. The cement slurry may be in accordance with any of the embodiments previously described. Likewise, curing the cement slurry may be in accordance with any of the embodiments previously described. As stated previously, cementing is performed when the cement slurry is deployed into the well via pumps, displacing the drilling fluids still located within the well and replacing them with cement. The cement slurry flows to the bottom of the wellbore through the casing, which will eventually be the pipe through which the hydrocarbons flow to the surface. From there it fills in the space between the casing and the actual wellbore, and hardens. This creates a seal so that outside materials cannot enter the well flow, as well as permanently positions the casing in place.

The method may further include allowing the poly(lactic acid) to degrade when in contact with water at a temperature of greater than or equal to 100° C., greater than or equal to 120° C., greater than or equal to 140° C., or greater than or equal to 160° C. after curing the cement slurry. The temperature may be greater than or equal to 100° C. and less than or equal to 300° C., greater than or equal to 100° C. and less than or equal to 200° C., greater than or equal to 100° C. and less than or equal to 150° C., greater than or equal to 120° C. and less than or equal to 300° C., greater than or equal to 120° C. and less than or equal to 200° C., greater than or equal to 120° C. and less than or equal to 150° C., greater than or equal to 140° C. and less than or equal to 300° C., greater than or equal to 140° C. and less than or equal to 200° C., or greater than or equal to 140° C. and less than or equal to 150° C.

Additionally or alternatively, the method may further include allowing the poly(lactic acid) to degrade when in contact with water at basic conditions after curing the cement slurry due to the pH of the cement. The cement may have a basic pH of from 8 to 14, from 8 to 12, from 8 to 10, from 10 to 14, from 10 to 12, or from 12 to 14. Basic conditions may include a pH of greater than 7, such as a pH of from 8 to 14, from 8 to 12, from 8 to 11, from 8 to 10, from 8 to 9, from 9 to 14, from 9 to 12, from 9 to 11, from 9 to 10, from 10 to 14, from 10 to 12, from 10 to 11, from 11 to 14, from 11 to 12, or from 12 to 14. It is contemplated that the temperature and pH may be controlled to affect the degradation rate of the poly(lactic acid), such that the poly(lactic acid) may be degraded at a slower or faster rate depending on the requirements of a specific application. For instance, the poly(lactic acid) may be degraded at a relatively faster rate if the cured cement is anticipated to contact water relatively soon. Alternatively, the poly(lactic acid) may be degraded at a relatively slower rate to avoid reaction prior to the cement setting or if the cured cement is not anticipated to contact water relatively soon.

The method may then include allowing the metal oxide to contact water after allowing the poly(lactic acid) to degrade after curing the cement slurry, thereby expanding the metal oxide. In embodiments, the metal oxide may expand after contact with water by forming crystal. Specifically, MgO may react with water ($H_2O$) to form a $Mg(OH)_2$ crystal. Similarly, in embodiments, CaO may react with water ($H_2O$) to form a $Ca(OH)_2$ crystal, or both.

As stated previously, the poly(acrylic acid) block copolymer includes a t-butyl terminal group, an isobornyl terminal group, or both. In embodiments, the poly(acrylic acid) block copolymer may comprise poly(acrylic acid)-block-poly(tert-butyl acrylate). Alternatively or additionally to the methods previously described, in embodiments, the method may further include allowing the poly(acrylic acid) block copolymer to deprotect when in contact with the acid catalyst at a temperature of greater than or equal to 100° C., greater than or equal to 120° C., greater than or equal to 140° C., or greater than or equal to 160° C. after pumping the cement slurry into the annulus, thereby removing the t-butyl terminal group, an isobornyl terminal group, or both, and thereby forming a hydrophilic homopolymer of poly(acrylic acid). The block copolymer structure of the poly(acrylic acid) block copolymer may be beneficial because the block of poly(acrylic acid) acts as an anchoring group on the metal oxide while the block of poly(tert-butyl acrylate) group acts as a latent initiation site where the presence of the acid catalyst under heating can lead to deprotection of the poly (acrylic acid) block copolymer as previously described. The temperature may be greater than or equal to 100° C. and less than or equal to 300° C., greater than or equal to 100° C. and less than or equal to 200° C., greater than or equal to 100° C. and less than or equal to 150° C., greater than or equal to 120° C. and less than or equal to 300° C., greater than or equal to 120° C. and less than or equal to 200° C., greater than or equal to 120° C. and less than or equal to 150° C., greater than or equal to 140° C. and less than or equal to 300° C., greater than or equal to 140° C. and less than or equal to 200° C., or greater than or equal to 140° C. and less than or equal to 150° C.

The method may further include allowing the hydrophilic homopolymer of poly(acrylic acid) to degrade when in contact with water at a temperature of greater than 100° C. after curing the cement slurry. In embodiments, the poly (lactic acid) or the hydrophilic homopolymer of poly(acrylic acid) may degrade when in contact with water in temperatures from 100° C. to 500° C., from 100° C. to 200° C., from 100° C. to 180° C., from 100° C. to 175° C., from 150° C. to 200° C., from 150° C. to 180° C., from 170° C. to 200° C., from 170° C. to 180° C., or from 175° C. to 180° C. In embodiments, degradation may begin to occur at 100° C., 120° C., 150° C., 170° C., or 177° C. The method may further include allowing the metal oxide to contact water after allowing the poly(acrylic acid) to degrade after curing the cement slurry, thereby expanding the metal oxide. In embodiments, the metal oxide may expand after contact with water by forming a $Mg(OH)_2$ crystal, a $Ca(OH)_2$ crystal, or both.

Embodiments of the disclosure also relate to methods of producing cured cements. The method may include combining water with a cement precursor material and an expanding agent as described herein to form a cement slurry. The cement slurry may be in accordance with any of the embodiments previously described. The method may include curing the cement slurry by allowing for a reaction between the water and the cement precursor material to produce cured cement. The curing step may be in accordance with any of the embodiments previously described.

In some embodiments, cement is composed of four main components: tricalcium silicate ($Ca_3O_5Si$), which contributes to the early strength development; dicalcium silicate ($Ca_2SiO_4$), which contributes to the final strength, tricalcium aluminate ($Ca_3Al_2O_6$), which contributes to the early strength; and tetracalcium alumina ferrite. These phases are sometimes called alite and belite respectively. In addition, gypsum may be added to control the setting time of cement.

Cement slurry design is based on altering the hydration reactions by adding or removing specific additives. In one embodiment, the silicates phase in cement may be about 75-80 wt. % of the total material. $Ca_3O_5Si$ is the major constituent, with concentration as great as 60-65 wt. %. The quantity of $Ca_2SiO_4$ conventionally does not exceed 20 wt. %, 30 wt. % or 40 wt. %. The hydration products for $Ca_3O_5Si$ and $Ca_2SiO_4$ are calcium silicate hydrate ($Ca_2H_2O_5Si$) and calcium hydroxide ($Ca(OH)_2$), also known as Portlandite. The calcium silicate hydrate commonly called CSH gel has a variable C:S and H:S ratio depending on the temperature, calcium concentration in the aqueous phase, and the curing time. The CSH gel comprises +/−70 wt. % of fully hydrated Portland cement at ambient conditions and is considered the principal binder of hardened cement. Upon contact with water, the gypsum may partially dissolve, releasing calcium and sulphate ions to react with the aluminate and hydroxyl ions to form a calcium trisulphoaluminate hydrate (known as the mineral ettringite ($Ca_6Al_2(SO_4)_3(OH)_{12} \cdot 26H_2O$)). The ettringite will precipitate onto the $Ca_3O_5Si$ surfaces, thereby preventing further rapid hydration. The gypsum is gradually consumed and the ettringite continues to precipitate until the gypsum is consumed. The sulphates ion concentration will decrease and the ettringite will become unstable converting to calcium monosulphoaluminate hydrate ($Ca_4Al_2O_6(SO_4) \cdot 14H_2O$). The remaining unhydrated $Ca_3O_5Si$ will form calcium aluminate hydrate.

The cured cement may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$) sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, or combinations of any of these.

As described previously, the expanding agent within the cured cement may expand after contact with water at temperatures greater than or equal to 100° C. and less than or equal to 300° C., greater than or equal to 100° C. and less than or equal to 200° C., greater than or equal to 100° C. and less than or equal to 150° C., greater than or equal to 120° C. and less than or equal to 300° C., greater than or equal to 120° C. and less than or equal to 200° C., greater than or equal to 120° C. and less than or equal to 150° C., greater than or equal to 140° C. and less than or equal to 300° C., greater than or equal to 140° C. and less than or equal to 200° C., or greater than or equal to 140° C. and less than or equal to 150° C. As previously stated, the poly(lactic acid) or poly(acrylic acid) may degrade at these temperatures, allowing the water to contact the metal oxide, thereby expanding the metal oxide. The metal oxide may then form a $Mg(OH)_2$ crystal, a $Ca(OH)_2$ crystal, or both. The hydroxide crystal may form within the cured cement, thereby expanding the volume of the cured cement and providing further sealing against water or hydrocarbon seepage from a subsurface formation and preserving the integrity of the wellbore.

Compressive strength is the resistance of a material to breaking under compression. A material with a greater compressive strength suffers less fracturing at a given pressure as compared to a material with a lesser compressive strength. Greater compressive strength is desirable for cured cements in a wellbore, as the cured cement is less likely to fracture in downhole conditions, where pressure may be greater than 20 psi, 200 psi, 500 psi, 1000 psi, 2000 psi, 3000 psi, 5000 psi, 7000 psi, or 10000 psi. The cured cement of the present disclosure may have a compressive strength of from 1000 to 7000 psi, from 1000 to 6000 psi, from 1000 to 5500 psi, from 1000 to 5200 psi, from 1000 to 5000 psi, from 1000 to 4700 psi, from 1000 to 4500 psi, from 1000 to 4100 psi, from 1000 to 3500 psi, from 1000 to 3000 psi, from 1000 to 2000 psi, from 2000 to 7000 psi, from 2000 to 6000 psi, from 2000 to 5500 psi, from 2000 to 5200 psi, from 2000 to 5000 psi, from 2000 to 4700 psi, from 2000 to 4500 psi, from 2000 to 4100 psi, from 2000 to 3500 psi, from 2000 to 3000 psi, from 3000 to 7000 psi, from 3000 to 6000 psi, from 3000 to 5500 psi, from 3000 to 5200 psi, from 3000 to 5000 psi, from 3000 to 4700 psi, from 3000 to 4500 psi, from 3000 to 4100 psi, from 3000 to 3500 psi, from 3500 to 7000 psi, from 3500 to 6000 psi, from 3500 to 5500 psi, from 3500 to 5200 psi, from 3500 to 5000 psi, from 3500 to 4700 psi, from 3500 to 4500 psi, from 3500 to 4100 psi, from 4000 to 7000 psi, from 4000 to 6000 psi, from 4000 to 5500 psi, from 4000 to 5200 psi, from 4000 to 5000 psi, from 4000 to 4700 psi, from 4000 to 4500 psi, from 4500 to 7000 psi, from 4500 to 6000 psi, from 4500 to 5500 psi, from 4500 to 5200 psi, from 4500 to 5000 psi, from 4500 to 4700 psi, from 4700 to 7000 psi, from 4700 to 6000 psi, from 4700 to 5500 psi, from 4700 to 5200 psi, from 4700 to 5000 psi, from 5000 to 7000 psi, from 5000 to 6000 psi, from 5000 to 5500 psi, from 5000 to 5200 psi, from 5200 to 7000 psi, from 5200 to 6000 psi, from 5200 to 5500 psi, from 5500 to 7000 psi, from 5500 to 6000 psi, from 6000 to 7000 psi, or from 4000 to 5200 psi, meaning that the cured cement will not fracture until its compressive strength has been exceeded.

Tensile strength is the resistance of a material to breaking under tension. A material with a greater tensile strength suffers less fracturing at a given tension as compared to a material with a lesser tensile strength. The cured cement of the present disclosure may have a tensile strength of from 300 to 600 psi, from 300 to 550 psi, from 300 to 525 psi, from 300 to 500 psi, from 300 to 450 psi, from 450 to 500 psi, from 450 to 525 psi, from 480 to 520 psi, from 450 to 550 psi, from 450 to 600 psi, from 500 to 525 psi, from 500 to 550 psi, from 500 to 600 psi, from 525 to 550 psi, from 525 to 600 psi, or from 550 to 600 psi, meaning that the cured cement will not fracture until its tensile strength has been exceeded.

In some embodiments, the cement slurry may contain water and may be water-based. As such, the cement slurry may by hydrophilic, forming stronger bonds with water-wet surfaces. Well sections drilled with non-aqueous drilling fluids may have oil-wet surfaces, resulting in poor bonding between the well and the cement slurry, as oil and water naturally repel. Poor bonding may lead to poor isolation and a buildup of unwanted casing-casing or tubing-casing annular pressure. Without being bound by theory, it is desirable to make the subsurface formation or casing water wet to enhance and improve the bonding between cement and casing and cement and subsurface formation. If the wettability of the subsurface formation or casing is oil wet not water wet then the bonding will be poor and could result in small gap(s) or channel(s) between the cement and casing or the cement and subsurface formation thereby resulting in improper wellbore isolation. This improper wellbore isolation could lead to fluid or gas escaping from the well through this gas or channel due to de-bonding.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of producing a poly(acrylic acid) block copolymer-metal oxide nanocomposite comprising:
   synthesizing a poly(acrylic acid) block copolymer comprising a t-butyl terminal group, an isobornyl terminal group, or both via reversible addition-fragmentation chain transfer (RAFT) polymerization; and
   grafting the poly(acrylic acid) onto MgO nanocomposites, CaO nanocomposites, or both, thereby forming the poly(acrylic acid)-metal oxide nanocomposite.

2. The method of claim 1, further comprising producing a cement slurry by mixing water, a cement precursor material, and an expanding agent comprising at least the poly(acrylic acid)-metal oxide nanocomposite.

3. The method of claim 2, in which the cement slurry further comprises from 15 to 100 mol. % acid catalyst relative to combined moles of the t-butyl terminal group and the isobornyl terminal group.

4. The method of claim 3, in which the acid catalyst comprises sulfonic acid, para-toluene sulfonic acid, hydrochloric acid, trifluoroacetic acid, aqueous phosphoric acid, molecular iodine, zinc bromide, or combinations thereof.

5. The method of claim 3, in which the sulfonic acid comprises para-toluenesulfonic acid.

6. The method of claim 2, in which:
   the cement precursor material comprises calcium hydroxide, silicates, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmillerite ($4CaO \cdot Al_2O_3 \cdot Fe_2O_3$), gypsum ($CaSO_4 \cdot 2H_2O$), Portland cement precursor, siliceous fly ash, calcareous fly ash, slag cement, or combinations of these; and
   the cement slurry optionally comprises sodium oxide, potassium oxide, limestone, lime (calcium oxide), hexavalent chromium, trivalent chromium, calcium aluminate, quartz, silica fume, or combinations of these.

7. The method of claim 2, in which the cement slurry contains from 0.1 to 10 wt. % BWOC of one or more additives selected from the group consisting of accelerators, retarders, extenders, suspending agents, weighting agents, fluid loss control agents, lost circulation control agents, surfactants, antifoaming agents, and combinations of these.

8. The method of claim 1, in which synthesizing via reversible addition-fragmentation chain transfer (RAFT) polymerization comprises:
   providing 2-(Butylthiocarbonothioylthio) propanoic acid as a RAFT agent;
   providing tert-butyl acrylate, isobornyl acrylate, or both, as monomers; and
   providing 4,4'-azobis(4-cyanovaleric acid) as an initiator.

9. The method of claim 2, in which the expanding agent comprising at least the poly(acrylic acid)-metal oxide nanocomposite has a structure of:

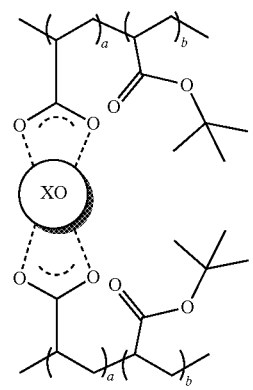

where XO is MgO, CaO, or both; a ranges from 1 to 100; and b ranges from 1 to 100.

10. The method of claim 2, in which the expanding agent comprising at least the poly(acrylic acid)-metal oxide nanocomposite has a structure of:

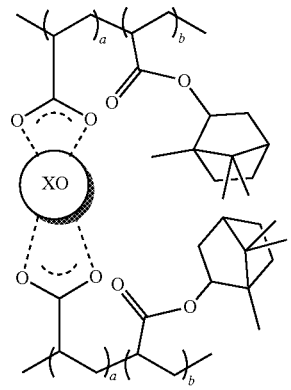

where XO is MgO, CaO, or both; a ranges from 1 to 100; and b ranges from 1 to 100.

* * * * *